United States Patent Office

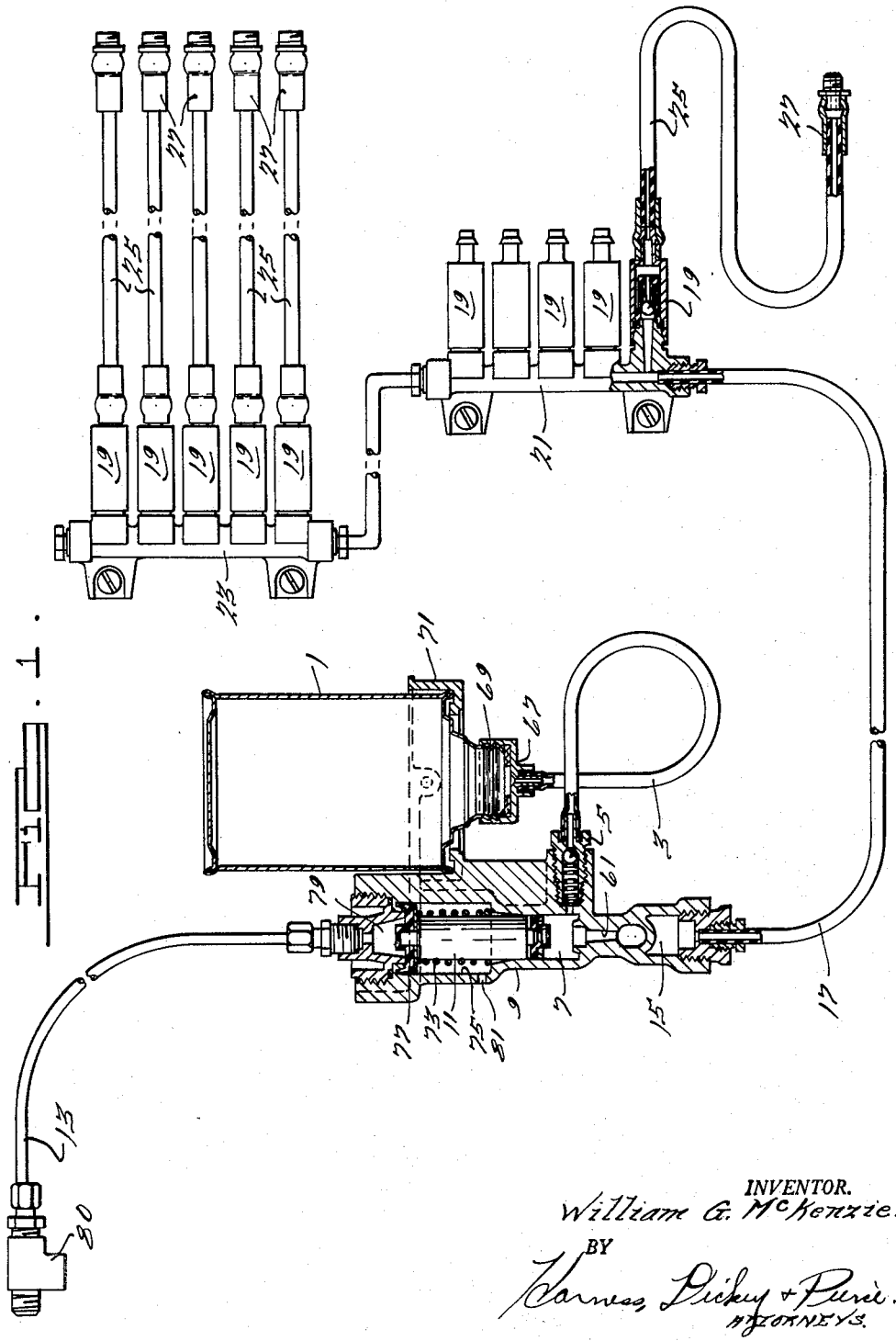

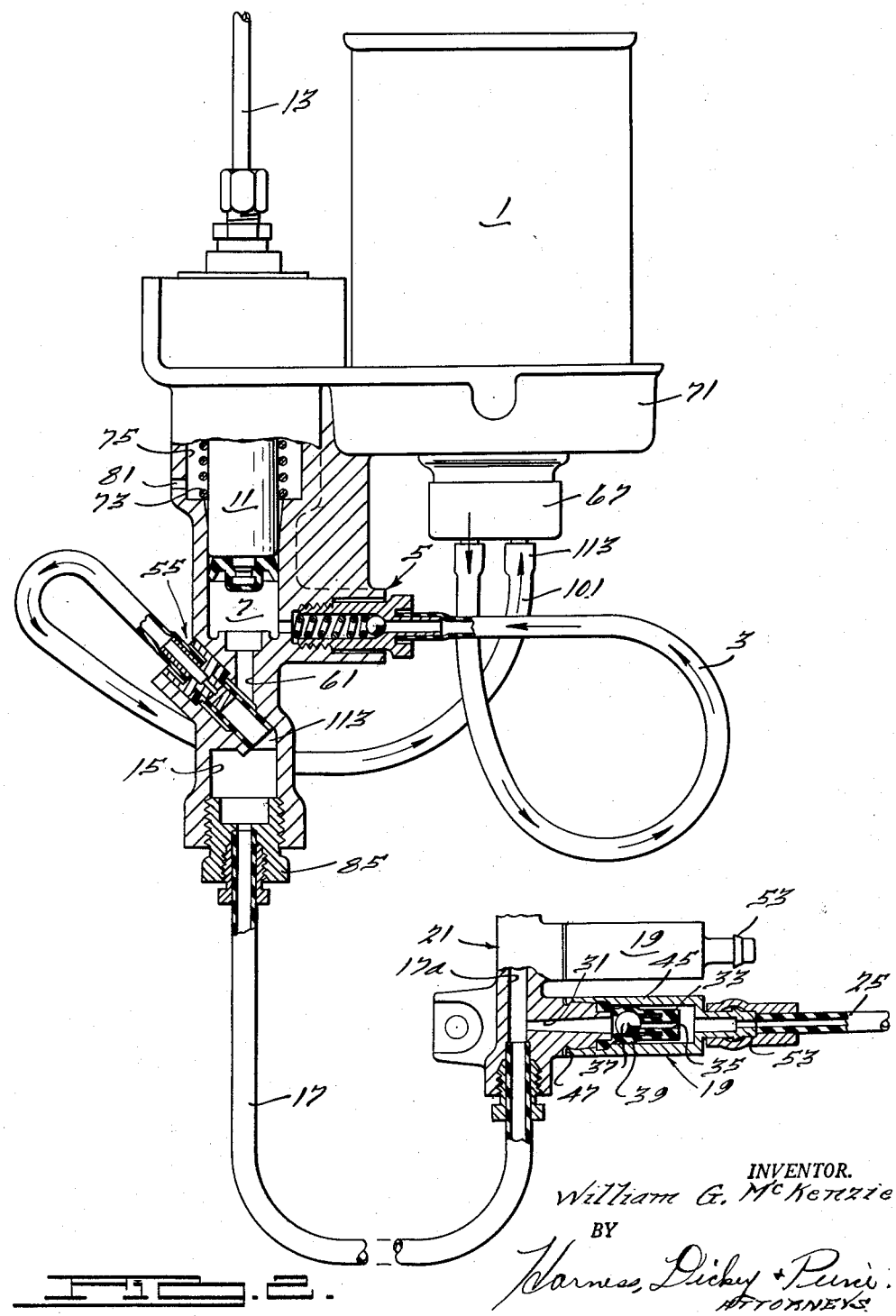

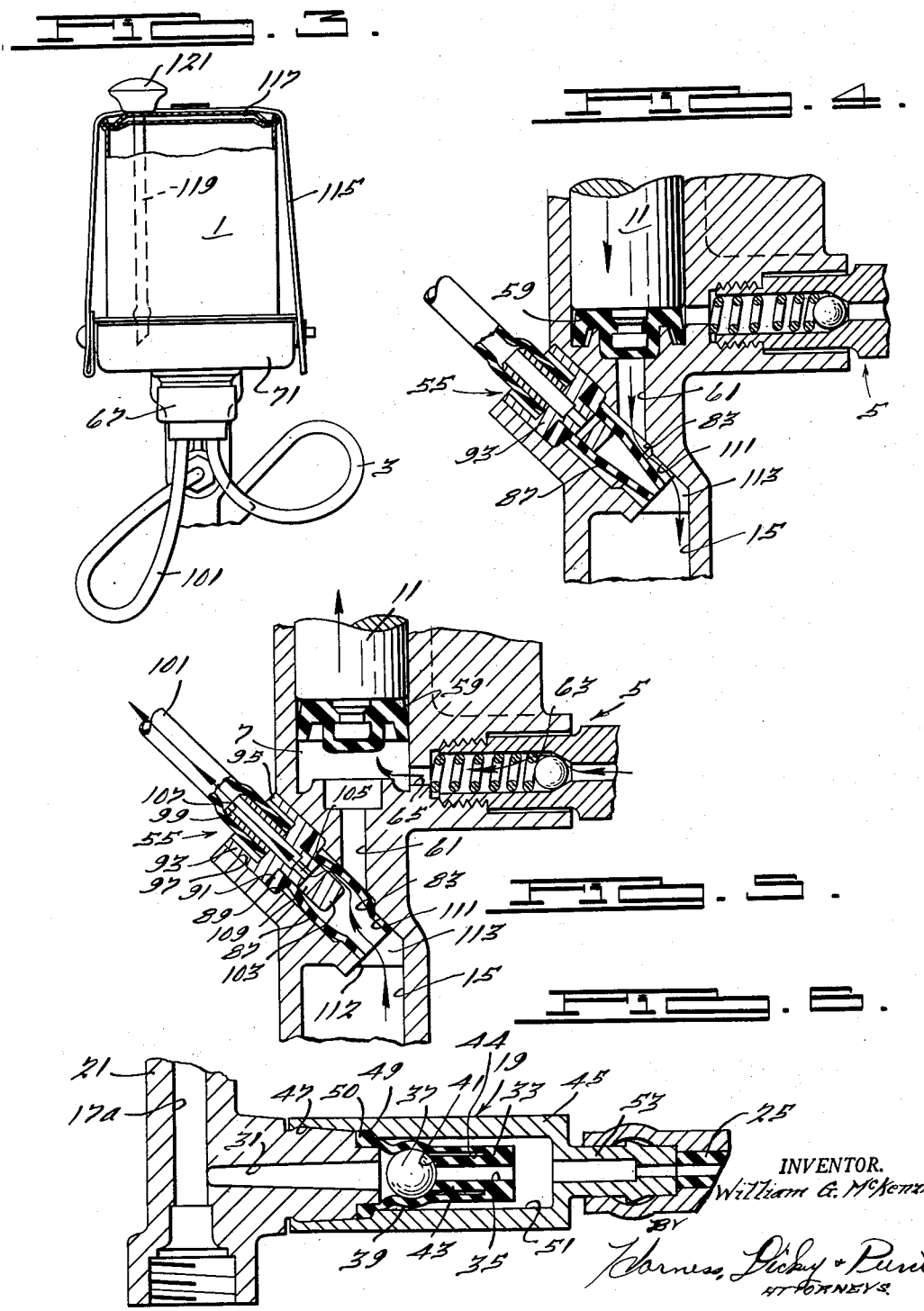

3,115,282
Patented Dec. 24, 1963

3,115,282
FORCED FEED DISPENSING SYSTEM
William G. McKenzie, Racine, Wis., assignor to Walker Manufacturing Company, a corporation of Delaware
Filed Sept. 22, 1959, Ser. No. 841,500
15 Claims. (Cl. 222—318)

My invention relates to pressure feed systems for dispensing liquids, such as lubrication systems. This application constitutes a continuation-in-part of my copending application, Serial No. 799,787 filed March 16, 1959, now Patent No. 3,051,263.

In the application referred to above I have disclosed a novel type of meter valve which can be used in liquid dispensing systems such as lubricating systems, to deliver measured quantities of liquid under pressure. It is important to satisfactory functioning that no air be trapped in the system and it is the purpose of the present invention to provide an arrangement which will automatically prevent this from occurring in a pressure feed type lubricating or liquid dispensing system.

In accomplishing the purpose of my invention, I arrange the flow passages so that air will collect at a predetermined point and I provide a unique type of valve member responsive to variations in pressure at the outlet of the pump for permitting air at the collection point to escape to reservoir and be replaced by oil from back flow of the meter valves.

The detailed features of construction and other objects and purposes of the invention will become apparent upon consideration of the presently preferred embodiment which is shown in the accompanying drawings in which:

FIG. 1 is a view, partly broken away and partly in section, and with parts removed, of my improved liquid dispensing system;

FIG. 2 is an enlarged view, partly in section, of the pressure source and two of the metering valves, the valving at the pressure source being sectioned on a plane spaced 90° from the section in FIG. 1;

FIG. 3 is a side elevation of a portion of the system showing one method for mounting the liquid supply can in place;

FIG. 4 is an enlarged view of the pressure and distribution chambers shown in FIG. 2 and reveals the pump piston in its extreme pressure applying position;

FIG. 5 is a view similar to FIG. 4 but shows the pump piston on its return stroke; and FIG. 6 is an enlarged view of the metering valve.

Referring first to FIG. 1 for an overall glance at the functioning of my improved dispensing system, the reservoir or supply of liquid to be furnished is illustrated in the form of a cartridge or can 1 which is suitably vented so that it contains the liquid at atmospheric pressure. It supplies liquid through the line 3 and check valve device 5 to pump chamber 7. The pump chamber 7 is formed in a housing 9 containing the pump piston 11 which is actuated by pressure fluid furnished to it through line 13. Liquid from can 1 under pressure of the pump piston 11 flows through an air eliminating valve device that does not appear on FIG. 1, into an air elimination chamber 15 and then into a main conduit 17. The main pressure line 17 supplies liquid to a battery of metering devices or valves 19 which are preferably constructed in accordance with my aforementioned copending application. These valves may be formed as parts of manifolds 21 and 23 if desired. The metering valves 19 furnish predetermined quantities of oil or liquid under pressure to the individual delivery lines 25 which will run to each of the points to be lubricated or to receive the liquid being supplied. The meters are also capable of maintaining pressure at all times on lines 25, a desirable feature for a lubrication system. The end of each of the lines 25 is provided with a suitable fitting 27 for attachment to the apparatus at the point to receive fluid.

Referring now to the metering valve 19 as best illustrated in FIGS. 2 and 6, it will be seen that liquid reaches it from a passage 31 which is supplied with liquid from the main line passage 17a in the manifold block 21, the passage 17a being an extension of the main conduit 17. As illustrated in FIGS. 5-9 of my copending application, the metering valve 19 includes an elastic bladder 33 which is formed of rubber, neoprene, or suitable elastic material that is not adversely affected by the liquids being dispensed. The bladder 33 has a through passage 35 which receives liquid supplied to the metering device from passage 31 after liquid has succeeding in passing by the ball-type valve 37 which is, as shown, somewhat larger in diameter than the diameter of a cylindrical skirt portion 39 of the bladder 33. The ball 37 seats against skirt 39 and also can, as shown, seat against the contoured end face 41 of a cylindrical boss or neck 43 which is inside of and partially co-extensive with the outer and thinner skirt 39, and it is also possible for it to seat against the end of passage 31. Due to the fact that the skirt 39 surrounds a portion of the length of the boss 43 and is spaced from it an annular chamber 44 is provided downstream of the ball. As will become apparent hereinafter, it is this chamber which measures or meters the quantity of liquid delivered during each cycle of operation.

Surrounding the bladder 33 is a cylindrical jacket 45 which is affixed in a suitable manner at 47 to the manifold 21. The jacket 45 may be provided with a shoulder 49 to engage and compress a thickened rom 50 on the end of skirt 39 against the manifold 21. The jacket 45 forms a chamber 51 around the bladder 33 and has an outlet nipple 53 so that the feed line 25 can be readily attached. The jacket is preferably small enough in diameter to furnish radial support for the bladder 33 to prevent excessive expansion in the event of unduly high pressures in the system.

In operation, when the pressure of liquid in the line 17a is raised to elevate the pressure of liquid in passage 31 the ball 37 will be forced tightly against the surface 41 to prevent the flow of liquid into the passage 35. However, the liquid under pressure can operate to expand the skirt 39 so that it no longer is in contact with the surface of the ball 37 and causes the skirt to balloon outwardly into the chamber 51. This reduces the volume of the chamber outside of the bladder 33 and increases the pressure on liquid in it so that liquid from the chamber is injected at relatively high pressure into line 25 through the outlet passage in nipple 53. As the pressure in the lines 31 and 17a is subsequently reduced, the higher pressure in the chamber 51 on the outside of skirt 39 as well as the elasticity of the skirt itself will cause the skirt to contract. As this occurs liquid inside of the bladder flows back into passage 31 and line 17. After a certain amount of pressure reduction and back flow the skirt 39 contacts the ball 37 and seals off the space inside of the bladder which is downstream from the ball, i.e., the chamber 44. Thus there is trapped in the chamber 44, at high pressure, a metered quantity of liquid. At this instant skirt 39 has not completely contracted because ball 37 is larger in diameter than the inside width of the skirt. As the upstream pressure drops more, the higher pressure on the downstream side of the ball forces it slightly off its seat allowing a predetermined quantity of liquid to flow from chamber 44 through passage 35 to enter chamber 51, in preparation for the next cycle of liquid injection into line 25. At the same time there is some additional back flow into line 31 as the skirt 39 continues to contract.

When the pressure of liquid in line 31 is raised again the expanded bladder 39 will force a quantity of fluid from chamber 51 to flow downstream (or be compressed if some gas is in chamber 51) into line 25. This quantity corresponds to the volume of expansion of the bladder. Upon subsequent contraction of bladder 39 when the pressure in line 31 is reduced, there will be a back flow from line 25 into chamber 51 which along with the metered quantity of liquid from chamber 44 fills the space previously occupied by the expanded bladder in chamber 51. Thus, the volume of liquid injected will be the volume of expansion of the bladder (reduction of volume of chamber 51) less the volume of back flow and this equals the metered volume of liquid. Hence, on each cycle the net volume of liquid injected is the metered quantity determined by the size of chamber 44.

Should the point to receive liquid be incapable of accepting it, e.g., a frozen bearing, the meter 19 will nevertheless function and maintain continuous pressure on it through line 25. In such case, the pressure of liquid in chamber 51 and the elasticity of the bladder will act to hold the skirt tight against the ball forming a seal to prevent back flow into passage 31 and consequent loss of pressure in chamber 51 and line 25. It will be seen therefore that the valves 19 meter and hold pressure downstream. Thus, if the point receiving liquid is one on which pressure should be maintained, the meter 19 will do that continuously regardless of conditions upstream of the ball 37.

It is evident that the presence upstream (i.e. in passage 31 or lines 17 and 17a) of slugs of compressible gas, such as air, would interfere with the proper functioning of the metering devices 19 and prevent them from delivering predetermined quantities of liquid to lines 25. In order to avoid this, I provide the housing with air eliminating valve mechanism 55 between the pump chamber 7 and the chamber 15 which operates each time the pressure is lowered in the system to return air to reservoir 1.

Liquid from reservoir 1 enters the piston chamber 7 above vertical outlet passage 61 through the check valve 5. This includes a ball valve 63 which is spring pressed to the closed position to block inlet flow through the passage 65 into the bottom of chamber 7. Liquid reaches the ball check 63 through the line 3 which is suitably attached to the outlet of a cap 67 into which is threaded the neck 69 of the liquid supply can 1, the can being supported above the pump chamber 7 on bracket 71. It will be seen that the partial vacuum created in chamber 7 when pump piston 11 moves up (FIG. 5) from its down position (FIG. 4) will unseat ball 63 and allow liquid to flow from can 1 into chamber 7 to fill it along with the other passages and chambers connected to it and on a lower level.

The piston 11 can be forced downwardly by any desired means when it is desired to actuate the meters 19. For the return stroke, I have illustrated the use of a uniform diameter helical coil spring 73 which seats on the bottom of chamber 75 in the housing 9 and which presses against the packing 77 at the top end of piston 11. For the down stroke against the combined resistance of spring 73 and bladders 33, suitable fluid under pressure, such as air or oil, may be supplied by the line 13 to chamber 79 on the outside of packing 77, the fluid in line 13 being under the control of a suitable valve 80. This fluid pressure will act against the large area of packing 77 and will force piston 11 down toward the extreme lower position shown in FIG. 4. Bleed off hole 81 at the bottom of the chamber 75 prevents a vacuum lock of the piston 11.

When the piston moves down, liquid is forced to move through passage 61. Upon leaving passage 61 it enters the angularly disposed chamber 83 in which is mounted the valve mechanism 55. After flowing across the chamber 83 it enters the air elimination or collection chamber 15 which leads directly into feed line 17 through a suitable packing structure 85. The volume of chamber 15 is preferably greater than the volume of the chamber 7, i.e., greater than the volume of fluid pumped on one stroke of piston 11.

The valve mechanism 55 has as its valve element an elastic sleeve 87 which may be made of the same material as the bladder 33, such as rubber. The outer end of the sleeve 87 is thickened and engages a shoulder 89 in the housing 9, being pressed against it by the face 91 of the valve core 93. The core 93 also has an annular peripheral flange 95 which may be threaded or pressed into the opening 97 in the housing 9. Projecting from the center section of the core in the direction of the flange 95 is a tubular section 99 around which is fitted the end of conduit 101. The conduit 101 has a suitable connection with cap 67 at 113. Projecting in an opposite direction from section 99 is a cylindrical portion 103 and it has a short axial passage 105 that opens into the inside 107 of the tubular section 99. The passage 105 communicates with the transverse passages 109 which open radially out of the valve core projection 103 at a point within sleeve 87. The section 103 is approximately the same diameter as the inside diameter of the sleeve 87, but the chamber 83 is somewhat larger than the sleeve so that the sleeve can expand diametrically away from the openings of passages 109 through sides of the section 103. The valve chamber 83 is reduced in diameter at 111 to approximate the outer diameter of sleeve 87 in order to support the free end of the sleeve as seen best in FIG. 5. It is to be noted that the bottom end face 112 of the chamber 83 is at an angle to the axis of chamber 15 thus providing a pocket 113 at the top of chamber 15 where air or gas will accumulate because it is lower in density than liquid in chamber 15.

When the piston 11 is forced downwardly as in FIG. 4, the liquid in passage 61 will press harder against the outside of the sleeve 87, shown in its normal position in FIG. 2, forcing it away from wall section 111 so that liquid can flow from chamber 7 to chamber 15. When this occurs, the liquid already present in chamber 15 will be forced through line 17 and through metering devices 19 into the points to be fed. The total volume of liquid that can be accommodated by all of the meters 19 in the system is less than the volume of liquid that will be pumped from chamber 7 by a full stroke of piston 11. Hence, there will be pressure on the entire system when the piston is in the down position of FIG. 4. During this period the sleeve 87 will cover and seal off the passage 109 as shown in FIG. 4.

When the piston 11 is permitted to rise under the influence of spring 73, a vacuum condition will be created in the chamber 7, passage 61, and chamber 83. The higher pressure of liquid in chamber 15 will act on the inside of the resilient sleeve 87 and cause it to expand inside of lower pressure chamber 83, as shown in FIG. 5, to seal off the end of the passage 61. The sleeve 87 also moves away from passages 109 so that air or gas can enter them and flow up through passages 105 and 107 into line 101 and back to the vented reservoir.

In the event that all (or nearly all) the liquid in can 1 is used up, further operation of piston 11 will result in air being pumped into the system. Because chamber 15 is larger than chamber 7 and because the air will be greatly reduced in volume on the compression stroke, it will be obvious that air pumped into the system will not go further into the system than collection chamber 15. The chamber 15 is large enough in diameter so that the air can rise through the heavier liquid to collect in pocket 113 and the inside of sleeve 87. Upon the up stroke of piston 11 back flow from the meters 19 will cause the level of liquid in chamber 15 to rise forcing the air to flow out through line 101 and back to the reservoir. The maximum amount of air that the system will hold depends on how long the meters 19 continue to function. As the volume of air increases the pressure that can be applied by piston 11 to the liquid in the system is reduced, due to compressibility of the air. Eventually a point will be reached where sufficient pressure cannot be obtained to unseat the skirts 39 from the peripheries of balls 37 and the system then loses no liquid on the compression stroke. After this point is reached additional pumping of air merely causes the air to recirculate to the reservoir 1. The resistance of bladders 33 and the size of chamber 15, etc., are selected so that this point is reached when liquid still remains in chamber 15.

If the reservoir is replenished with liquid after air has been pumped into the system, the first stroke of piston 11 will force a charge of the liquid into the chamber 15. It will be noted that the bottom end 59 of the piston fits closely into the bottom of the chamber 7 (FIG. 4) so that any air in chamber 7 will be squeezed out and into passage 61. Because passage 61 is very narrow it is not possible for air to rise through relatively viscous liquid in it to reach chamber 7. After the charge of liquid has been pumped into the system the subsequent release of pressure on the upstroke of piston 11 will seal off the bottom of passage 61 (FIG. 5) and result in a substantial volume of air being forced to flow back to the reservoir through line 101, the exact amount depending upon whether and how much liquid the meters 19 injected on the compression stroke. Within another cycle or two of full liquid charges, all of the air will be forced out of the system.

In the event that several of the devices receiving liquid refuse to accept that which is furnished by the meters 19 (e.g., frozen bearings) the meters 19 will maintain pressure on the devices but the total quantity of liquid accepted by the system will be reduced. This may result in a condition wherein the piston 11 will not make a full compression stroke. In such case less compression of the increasing rate coil spring 73 is required with the result that the piston 11 applies greater pressure to the system than in the case of a full stroke. Thus, pressure on a frozen bearing is not only maintained but actually increased and tends to clean out the bearing.

FIG. 3 illustrates a strap 115 of U-shape which can be used along with spring element 117 to hold the can 1 in place on the bracket 71. The rod 119 with knob 121 attached, can be projected through suitable openings in the inverted bottom of the can 1 to serve as a dip-stick for measuring the depth of liquid in the can. Instead of a replaceable can, it is obvious that a refillable reservoir can be used if desired.

It will be clear that many modifications may be made in the specific constructions disclosed herein without departing from the spirit and scope of the invention. The system can be used with meters 19 that meter different quantities. Also the meters 19 can be used in appropriate systems to meter gas.

I claim:

1. In a metering valve, means providing a variable volume chamber, means providing a second chamber surrounding the variable volume chamber, said variable volume chamber increasing in volume upon increase in the pressure of fluid therein, the volume of said second chamber located outside of the variable volume chamber decreasing when the variable volume chamber increases in volume, means providing an inlet for the flow of fluid to the variable volume chamber and an outlet for the flow of fluid from the second chamber, a connection between said chambers, and valve means in said connection controlling the flow from the variable volume chamber to the second chamber.

2. A metering valve comprising a housing having a chamber inside and provided with an outlet for said chamber, an expandable bladder in said housing chamber, means providing a fluid inlet at one end of the said expandable bladder, means permitting flow through said expandable bladder, said expandable bladder containing a valve element operative to control the flow through the bladder, the pressure of the material being metered acting to cause expansion of the bladder into said housing chamber upon admission of fluid through said inlet.

3. In a valve for measuring and delivering predetermined quantities of fluid comprising a housing having an inlet for fluid, an elastic bladder surrounding said inlet and receiving all fluid flowing through it, said housing providing a chamber around the outside of the said bladder, expansion and contraction of said bladder changing the volume of said chamber, said chamber having an outlet for fluid, and valve means inside said bladder acting to block the flow of fluid through the bladder when fluid enters under pressure through said inlet, said pressure thereby causing expansion of the bladder to reduce the volume of said chamber.

4. In a metering valve comprising a rigid walled housing providing a chamber having an inlet at one end and an outlet at the other end, a tubular elastic member open at both ends disposed in said chamber and having one end connected to the inlet of the chamber to receive fluid flowing through the inlet, the other end of said tubular member opening into said chamber, means providing a valve seat in said elastic member located at said other end, a valve inside said elastic member and cooperating with said valve seat to permit or block flow out of said other end, said valve element being slightly larger in diameter than the diameter of said elastic member.

5. In a lubricating or liquid dispensing system, a reservoir for liquid, a reciprocable pump including a pump chamber of predetermined maximum volume, a first conduit connecting the chamber to the reservoir, a valve for controlling liquid flow to the point to receive liquid, a second conduit connecting the pump chamber to the valve, and a third conduit connected to said reservoir at one end and at its other end to a point in said second conduit close to said pump chamber, the volume of said second conduit between said third conduit and said valve being greater than said predetermined maximum pump volume.

6. In a liquid dispensing system, a plurality of metering valves for delivering predetermined quantities of liquid, a conduit for supplying liquid under pressure to said metering valves, said metering valves exerting back pressure on said conduit and being of the type causing back flow of liquid, said conduit including a collection chamber, a pump chamber, means connecting the pump chamber to the collection chamber, said pump chamber being of less volume than the collection chamber, and means providing for escape of gas from said collection chamber to a point other than said conduit or pump chamber.

7. In a fluid dispensing system, a plurality of meters for measuring and supplying under pressure predetermined quantities of liquid, a feed line for supplying liquid to said meters, a pump connected to said feed line for supplying liquid to it under pressure, a reservoir connected to the pump for supplying liquid to it, an air collection chamber in said feed line and located to receive all air trapped in the feed line, said collection chamber being exposed to back pressure in the feed line, and means connecting the collection chamber to a point at atmospheric pressure.

8. In a liquid dispensing system, a pressure source, a first chamber receiving liquid from said pressure source, a second chamber receiving liquid from said first chamber, a delivery line receiving liquid from said second chamber, said first chamber having an outlet, a single resilient valve member in said first chamber controlling flow through said outlet and from the first chamber to the second chamber, said valve member being operated by pressure from said pressure source to connect said pressure source to said second chamber, said valve member being operated by a higher pressure in said second chamber then in the first chamber to block flow from the second chamber to the pressure source and to open said outlet.

9. In a fluid system, a housing having an integrally formed chamber, said chamber having an enlarged section and a reduced section immovable with respect to each other, a tube having a closed end projecting centrally into said enlarged section, said tube having an opening in the side wall thereof, a rubberlike sleeve over said tube and in normal contracted position closing said opening, said sleeve extending past said closed tube end through said enlarged chamber and the wall thereof fitting the wall of said reduced section, said sleeve being expanded and collapsible to control flow through said chamber and tube.

10. In a fluid dispensing system, a plurality of meters for delivering predetermined quantities of fluid, said meters each having an inlet port to maintain fluid pressure downstream therefrom in response to pressure at said inlet port, said meters being responsive to downstream pressure so that when said pressure reaches a predetermined value with respect to the pressure in the system said meter will stop the flow of fluid therethrough, and a pump for delivering fluid under pressure to the inlet ports of said meters, said pump including means inversely relating the pressure and the volume delivered by it so that when the volume delivered by said pump falls below a predetermined minimum the pressure fluid pumped is increased.

11. In a liquid dispensing system, a plurality of liquid delivering devices of the type producing back flow upon deactuation of the system, pump means for actuating the system by delivering liquid under pressure to said devices, a conduit connecting said means to said devices, said conduit including a vertically disposed chamber below said pump means having a narrowed upper end forming corner pocket at the top, a gas release valve operating when said pump means is off and extending at an angle upwardly and away from said narrowed upper end of said chamber and having an inlet end opening into said corner pocket whereby gas mingling with liquid in said chamber will rise therein into said corner pocket and flow through said inlet into said valve, an outlet for said valve, and a reservoir connected to said outlet, the valve being responsive to said pump means being off to connect said inlet end to said outlet and responsive to pressure created by said pump means to close the connection between said inlet end and said outlet.

12. In a liquid dispensing system, a pump including a chamber and a piston reciprocating in said chamber, said piston having a circular packing at the fluid engaging end, said chamber having an annular end wall shaped to a contour corresponding to the outer surface shape of said packing so that upon a full pressure stroke said packing will fit into said end wall in a manner to reduce the volume of said chamber to substantially zero, and an outlet passage from said chamber opening centrally into said end wall and of small cross sectional area so that the viscosity of liquid in said passage will prevent reverse flow of gas in the passage.

13. The invention set forth in claim 12 including a gas collecting chamber beneath and wider than said outlet passage and arranged to receive liquid from said outlet passage, the top of said chamber being the most adjacent parts to said outlet passage, an annular shoulder between said outlet passage and the top of said chamber, an upwardly recessed portion in said shoulder forming a corner pocket, and a combination check valve and gas release valve in said chamber and extending from said corner pocket for controlling flow from said chamber to said outlet passage and the release of gas from said chamber.

14. A metering valve for measuring and delivering predetermined quantities of fluid comprising an outer casing having rigid walls and providing a chamber having an outlet, means providing an inlet to said chamber, a flexible member surrounding said inlet and receiving all fluid from it, said flexible member containing a valve seated on its outlet periphery in said member at a section located intermediate the ends of the member, said flexible member having an outlet and a valve seat against which a face of said valve engages to block flow through said member outlet, said flexible member including a chamber located downstream from said valve and sealed off by said valve when the periphery of the valve engages the member, said valve being movable to provide for flow from said downstream chamber into said member outlet, said member outlet opening into said casing chamber, said flexible member being expandable into said casing chamber to reduce volume thereof when fluid enters said inlet.

15. In a fluid dispensing system, a plurality of meters for delivering predetermined quantities of fluid, said meters to maintain fluid pressure downstream therefrom, said meters responsive to downstream pressure so that when said pressure reaches a predetermined value with respect to the pressure in the system said meters will stop the flow of fluid, a pump for delivering fluid under pressure to said meters, and an increasing rate spring, said pump including a piston having its suction stroke energized by said spring whereby the pressure and the volume delivered by said pump are inversely related so that when the volume delivered by said pump falls below a predetermined minimum the pressure of fluid pumped is increased.

References Cited in the file of this patent

UNITED STATES PATENTS

| | | | |
|---|---|---|---|
| 1,194,705 | Brandenberger et al. | Aug. 15, | 1916 |
| 1,762,901 | Weinberg | June 10, | 1930 |
| 2,219,681 | Davis | Oct. 29, | 1940 |
| 2,328,812 | Klein | Sept. 17, | 1943 |
| 2,372,544 | Borman et al. | Mar. 27, | 1945 |
| 2,545,319 | Sundholm | Mar. 13, | 1951 |
| 2,669,321 | Schmidlin | Feb. 16, | 1954 |
| 2,669,271 | Davis | Jan. 11, | 1955 |
| 2,705,094 | Howell | Mar. 29, | 1955 |
| 2,723,161 | Covington | Nov. 4, | 1955 |
| 2,847,149 | Ainsworth | Aug. 12, | 1958 |
| 2,849,162 | Wright | Aug. 26, | 1958 |
| 2,869,572 | Person | Jan. 20, | 1959 |
| 2,894,664 | Mroz | July 14, | 1959 |
| 2,895,649 | Dawson | July 21, | 1959 |
| 2,996,190 | Harry | Aug. 15, | 1961 |

FOREIGN PATENTS

| | | | |
|---|---|---|---|
| 794,916 | Great Britain | May 14, | 1958 |

UNITED STATES PATENT OFFICE
CERTIFICATE OF CORRECTION

Patent No. 3,115,282                                     December 24, 1963

William G. McKenzie

It is hereby certified that error appears in the above numbered patent requiring correction and that the said Letters Patent should read as corrected below.

Column 2, line 15, for "succeeding" read -- succeeded --; line 32, for "rom" read -- rim --; column 3, line 35, before "air" insert -- an --; column 7, line 15, for "expanded" read -- expandable --; line 29, before "fluid" insert -- of --; column 8, line 1, for "parts" read -- part --; line 53, for "2,669,271" read -- 2,699,271 --.

Signed and sealed this 14th day of July 1964.

(SEAL)

Attest:

ESTON G. JOHNSON                                             EDWARD J. BRENNER
Attesting Officer                                                  Commissioner of Patents